May 24, 1949.  H. E. McCORDIC  2,471,161
METHOD OF MIXING BOTTLED NATURAL
GAS WITH VEGETATIVE GAS
Filed Feb. 9, 1948
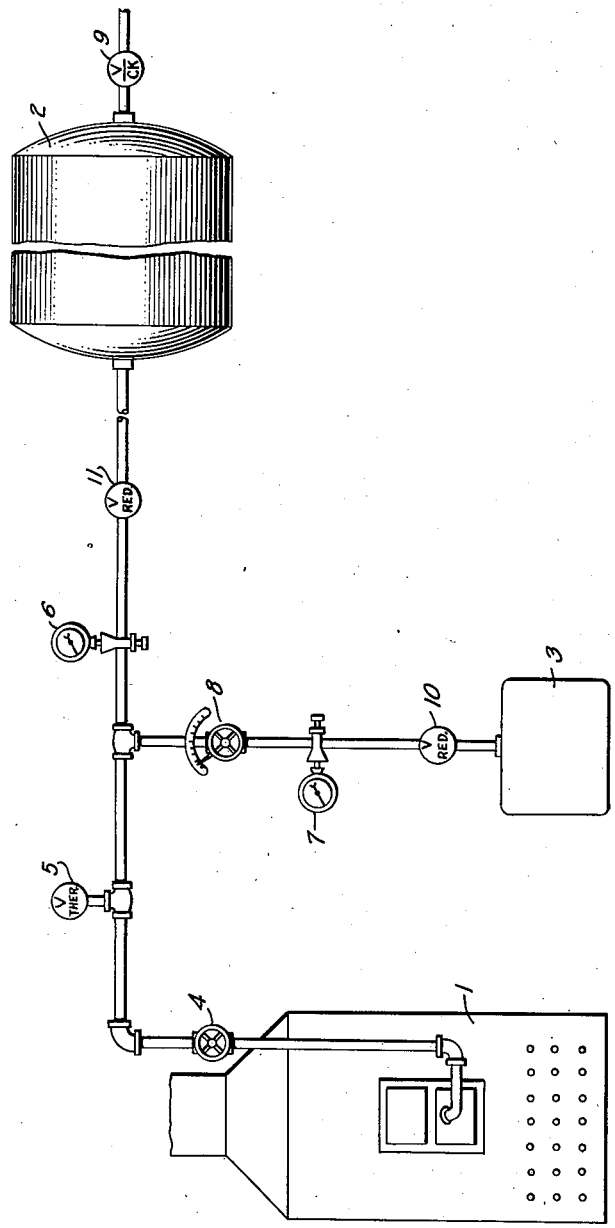
Inventor.
Herbert E. McCordic

Patented May 24, 1949

2,471,161

UNITED STATES PATENT OFFICE 2,471,161

METHOD OF MIXING BOTTLED NATURAL GAS WITH VEGETATIVE GAS

Herbert E. McCordic, Groton, S. Dak.

Application February 9, 1948, Serial No. 7,035

3 Claims. (Cl. 48—197)

This invention relates to combustible gas mixtures obtained from waste products and particularly waste farm products, and in particular a gaseous mixture from such waste products in combination with a small percentage of wild gasoline, natural gas, or products of processed natural gas, or the like.

The purpose of this invention is to provide means for utilizing waste products by converting the waste to gaseous form and blending inflammable wastes, as a booster, therewith.

The products from which the gas is obtained may be wastes from mineral coal, and oil, or wastes from rubber of any origin, or wastes from animal tissue, bird or fish life, or wastes from processed woods such as sawdust, short-lengths, splinters, chips and stumps, or wastes from decayed timber or partially decayed timber, or undesirable timber growths, and which by chopping, pounding, pulverizing, or other methods of pulping are made combustible, or which may be blended or combined with inflammable wastes or other materials by which they may be made combustible.

These gases are prepared by burning or partly burning waste products in a cupola having an air inlet connection in the upper end and a suction connection through perforated tubes under shields in the lower end wherein volatile gases such as carbon monoxide, are drawn from the lower end of the cupola, and these gases are washed, filtered, and placed in storage containers, or they may be blended or mixed with natural gas or other gases as may be desired.

The waste products which may also include unused combustible elements from farm lands such as straw, cornstalks, corn cobs, cotton stalks, pea vines, and weeds, may be used in their natural state or prepared by pulverizing or pulping and mixing with certain refractory elements, or by mixing or properly blending others of these said refractory elements with more inflammable wastes wherein the entire products are utilized in mass gas production.

The gas is, therefore, produced by a slow burning process of waste materials and particularly waste products, in which the gases of combustion, such as hydrogen, carbon monoxide, and other gases, are drawn off and processed by washing and filtering, and then mixed with wild gasoline or natural gas, or with products of processed natural gas, in such proportions that the final product will have a flash point adapted for general use. This vegetative gas product does not contain soot and tar elements, and while comparatively safe as to explosive characteristics, is no more deleterious to breathing than any other type of combustible gas.

It is preferred to use the wild gasoline or natural gas in quantities up to twenty percent of the product by volume depending upon the B. t. u. value or other characteristics of the gases being combined.

It will also be understood that the washing and filtering steps may include means for removing non-combustible substances in order to obtain a higher B. t. u. value of the final product.

Although the gas mixture herein described suggests certain materials and proportions it will be understood that modifications may be made in the use of different products or in the quantities of the products used without departing from the spirit of the invention.

In practical operation the two blending gases—vegetative and natural, as per accompanying drawings—are kept in separate containers under pressure.

These containers are vegetative gas No. 2 and bottle natural gas No. 3 of drawing. Pipeline of No. 2 leads to No. 1 as the furnace. Pipeline of No. 3 (bottle gas tank) leads to pipeline connecting No. 1 and 2, joining same near furnace No. 1; No. 9 is checkvalve securing vegetative gas, as this is pushed forward from gas generator by pump and compressor (not shown in cut); No. 11 pressure reducer on vegetative gas line; No. 10 pressure reducer on natural gas-line. No. 6 pressure gauge on natural gas line; No. 7 pressure gauge on natural gas line; No. 8 dialed hand valve regulating percentage mixture of natural gas going to vegetative gas-line; No. 5 thermostat automatically controlling gas mixture going to furnace No. 1; No. 4 hand valve controlling gas mixture going to furnace, No. 1.

In starting fire in furnace, with both vegetative and natural gas valves closed, operator must first check as to similar pressures on No. 6 and 7 pressure gauges; then such operator opens slightly hand valve 4 to furnace when a slight wheeze will be noted coming from burner of furnace; and a lighted match touched to this 100% pure high temperature vegetative gas will be promptly extinguished; but now turn a 5%, or thereabout, mixture of low temperature or low ignition point bottled natural gas and the fire starts instantly.

This flame will be of a light red, then for a few seconds, as the burner and furnace are warmed and the natural gas is valved down to around 2% or less the flame turns to a light blue as the slow, refractory high ignition point hydrogen and carbon monoxide—main constituents of the vegetative gas—more completely or completely occupies the field.

In case of accident or other mishap where the furnace flame is extinguished, and the escaping unburned gas mixture—attenuated to the 2% or less of the natural—cools to ordinary living room temperature, or lower, this slightly boosted high temperature vegetative gas becomes quite as safe, as to combustion or explosion, as tobacco smoke.

What is claimed is:

1. A mixture of 95% of a high ignition point vegetative gas and an appreciable per cent but not more than approximately 5% of a low ignition point bottled hydrocarbon gas, said mixture being readily combustible at low temperatures.

2. A mixture of 98½% of a high ignition point vegetative gas and approximately 1½% of a low ignition point bottled hydro-carbon gas, said mixture being readily combustible at high temperatures, but inert and non-combustible at low temperatures.

3. A method of safely and conveniently controlling combustion in a combustion chamber of a mixture of a low ignition point bottled hydrocarbon gas and a high ignition point vegetative gas which comprises introducing approximately 5% of said low ignition point gas into said high ignition point vegetative gas, promoting ready ignition in cold combustion chamber and when combustion chamber has reached a temperature sufficient to maintain combustion at a high temperature, decreasing the percentage of said hydro-carbon gas to approximately 1½% so that if combustion stops, the escaping unburned gas becomes non-combustible as it cools to living room temperatures.

HERBERT E. McCORDIC.

REFERENCES CITED

The following references are of record in the file of this patent:

UNITED STATES PATENTS

| Number | Name | Date |
|---|---|---|
| 16,682 | Choate et al. | Feb. 24, 1857 |
| 74,063 | Ensley | Feb. 4, 1858 |
| 140,396 | Turner | July 1, 1873 |
| 164,822 | Eichbaum | June 22, 1875 |
| 1,278,180 | McDonald | Sept. 10, 1918 |
| 1,728,389 | Brown | Sept. 17, 1929 |